(12) United States Patent
Merklin

(10) Patent No.: US 12,219,309 B2
(45) Date of Patent: Feb. 4, 2025

(54) FIXATION METHODS AND DEVICES FOR A PANEL MOUNTED DEVICE

(71) Applicant: Nice North America LLC, Carlsbad, CA (US)

(72) Inventor: Christopher Lee Merklin, Rohnert Park, CA (US)

(73) Assignee: Nice North America LLC, Carlsbad, CA (US)

( * ) Notice: Subject to any disclaimer, the term of this patent is extended or adjusted under 35 U.S.C. 154(b) by 0 days.

(21) Appl. No.: 18/395,049

(22) Filed: Dec. 22, 2023

(65) Prior Publication Data

US 2024/0357268 A1 Oct. 24, 2024

Related U.S. Application Data

(63) Continuation of application No. 17/714,976, filed on Apr. 6, 2022, now Pat. No. 11,882,391, which is a
(Continued)

(51) Int. Cl.
*H04R 1/02* (2006.01)
*F16B 2/06* (2006.01)
(Continued)

(52) U.S. Cl.
CPC ............. *H04R 1/026* (2013.01); *F16B 2/065* (2013.01); *F16B 33/004* (2013.01); *F16B 39/24* (2013.01)

(58) Field of Classification Search
CPC ........ H04R 1/026; F16B 2/065; F16B 33/004; F16B 39/24
See application file for complete search history.

(56) References Cited

U.S. PATENT DOCUMENTS

| | | | |
|---|---|---|---|
| 6,588,543 B1 * | 7/2003 | Tchilinguirian | F21V 21/04 362/147 |
| 7,587,059 B2 * | 9/2009 | Wright | H04R 5/02 381/387 |

(Continued)

FOREIGN PATENT DOCUMENTS

| | | | | |
|---|---|---|---|---|
| CA | 2977138 A1 * | 2/2018 | | E04B 9/006 |
| CN | 105848066 A * | 8/2016 | | H04R 1/025 |
| EP | 3288280 A1 * | 2/2018 | | E04B 9/006 |

OTHER PUBLICATIONS

MACLEAN-ESNA Precision Fasteners Catalog 9203, revised Apr. 2015 (Year: 2015).*
(Continued)

*Primary Examiner* — Eret C McNichols
*Assistant Examiner* — Ding Y Tan
(74) *Attorney, Agent, or Firm* — Fox Rothschild LLP

(57) ABSTRACT

A device is configured to be mounted to a planar mounting panel, including, for example, a wall or ceiling of a home or other building. The device includes a housing, a fastener, a dogleg tab and a friction inducing member. The housing is configured to be received in an aperture in the mounting panel and includes a housing aperture. The fastener is disposed in the housing aperture. The dogleg tab is operatively coupled to one end of the fastener. The dogleg tab is configured to be disposed in a retracted position and to be disposed in an engagement position, in which engagement position the dogleg tab is disposed to engage an inside surface of the mounting panel. The friction inducing member is fixedly attached to the housing adjacent the housing aperture and friction-fit to the fastener.

20 Claims, 11 Drawing Sheets

Related U.S. Application Data continuation of application No. 15/969,661, filed on May 2, 2018, now Pat. No. 11,336,977.

(51) Int. Cl.
  *F16B 33/00*   (2006.01)
  *F16B 39/24*   (2006.01)

(56) References Cited

U.S. PATENT DOCUMENTS

| | | | | |
|---|---|---|---|---|
| 9,084,046 B2* | 7/2015 | Ivey | ........................ | H04R 1/025 |
| 9,939,006 B2* | 4/2018 | Song | ........................ | F16B 47/00 |
| 10,638,840 B2* | 5/2020 | Moro | ........................ | F16B 45/00 |
| 10,820,081 B1* | 10/2020 | Belliston | ................. | H04R 1/025 |
| 11,212,604 B2* | 12/2021 | You | ........................ | F16B 21/04 |
| 2004/0179710 A1* | 9/2004 | Farinelli, Jr. | ........... | H04R 1/025 |
| | | | | 181/150 |
| 2005/0072891 A1* | 4/2005 | Wright | ................... | H04R 1/025 |
| | | | | 248/342 |
| 2012/0002835 A1* | 1/2012 | Stewart, Jr. | ............. | H04R 1/025 |
| | | | | 381/386 |
| 2013/0251181 A1* | 9/2013 | Stewart, Jr. | ............. | H04R 1/025 |
| | | | | 381/332 |
| 2014/0301586 A1* | 10/2014 | Stewart, Jr. | .............. | H04R 1/02 |
| | | | | 381/332 |
| 2014/0305734 A1* | 10/2014 | Ivey | ........................ | H04R 1/025 |
| | | | | 181/150 |
| 2015/0271578 A1* | 9/2015 | Marcum | ................... | H04R 1/02 |
| | | | | 381/395 |
| 2016/0091011 A1* | 3/2016 | Deck | ...................... | F16B 37/043 |
| | | | | 29/446 |
| 2016/0102803 A1* | 4/2016 | Humphreys | ........... | F16M 13/02 |
| | | | | 248/27.3 |
| 2016/0241940 A1* | 8/2016 | Yang | ....................... | H04R 1/026 |
| 2016/0366501 A1* | 12/2016 | Ivey | ....................... | H04R 1/026 |
| 2020/0077168 A1* | 3/2020 | Hart | ....................... | H04R 1/026 |
| 2020/0107089 A1* | 4/2020 | You | ........................ | H04R 1/026 |
| 2020/0186902 A1* | 6/2020 | Brousseau | ............. | H04R 1/025 |

OTHER PUBLICATIONS

MACLEAN-ESNA Precision Fasteners Catalog 9203, revised Sep. 2014 (Year: 2014).*

* cited by examiner

FIXATION METHODS AND DEVICES FOR A PANEL MOUNTED DEVICE

CLAIM OF PRIORITY

This application is a continuation of U.S. patent application Ser. No. 17/714,976 filed Apr. 6, 2022, which is a continuation of U.S. patent application Ser. No. 15/969,661, filed May 2, 2018, which are hereby incorporated by reference herein in their entirety.

BACKGROUND

The present disclosure relates to devices that are configured to be mounted to a planar mounting panel, including, for example, a wall or ceiling of a home or other building.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
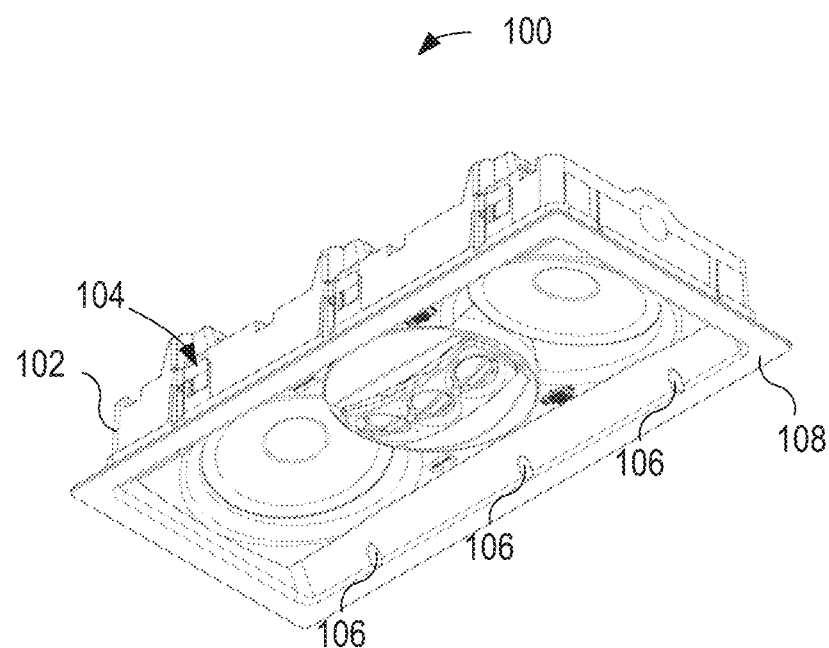
FIGS. 1A-1C depict an example device configured to be mounted to a planar mounting panel.

The present inventor(s) have recognized, inter alia, that a friction inducing device, for example, gasket may be used to ease the installation and uninstallation of devices by eliminating the inherent slack of dogleg fixation mechanisms with the integration of a durable friction element to consistently manage dogleg screw movement.

In one example, a device is configured to be mounted to a planar mounting panel, including, for example, a wall or ceiling of a home or other building. The device includes a housing, a fastener, a dogleg tab and gasket friction inducing member. The housing is configured to be received in an aperture in the mounting panel and includes a housing aperture. The fastener is disposed in the housing aperture. The dogleg tab is operatively coupled to one end of the fastener. The dogleg tab is configured to be disposed in a retracted position and to be disposed in an engagement position, in which engagement position the dogleg tab is disposed to engage an inside surface of the mounting panel. The friction inducing member is fixedly attached to the housing adjacent the housing aperture and friction-fit to the fastener.

As used in the present disclosure, "friction-fit" can be a mechanical coupling between components, which may also be referred to as interference-fit, shrink-fit, or press-fit, and which fastens two components by an induced force of friction therebetween. A press-fit, for example, can be achieved by pressing a shaft into an aperture, in which an outer diameter of the shaft is larger than an inner diameter of the aperture into which the shaft is pressed. A shrink-fit, as another example, can be achieved by heating an enveloping component, assembling the enveloping component into position while hot, and allowing the enveloping component to cool and contract back to a former size at ambient temperature. The compression that results as the enveloping part cools interferes or causes friction with the component enveloped by the enveloping part.

A variety of products are configured to be attached to a planar mounting panel, including, for example, to the wall or ceiling of a home or other building. Example devices installed, uninstalled, or retrofitted in this manner include speakers, home/building security and/or automation sensors, home/building security and/or automation panel controllers, among others. In such circumstances, the outer face of the mounting panel is accessible but the inner face is not. As such, these types of products may be disposed in an aperture that is cut into the mounting panel from the outer side and the device is then attached to the panel, in some cases by a fixation mechanism that is hidden on the inner side of the panel and is actuated from the outer side.

One type of such fixation mechanism is a dogleg mechanism, which functions to move between a retracted position and an engagement position. In the retracted position, a dogleg tab of the mechanism is retracted to allow the device to be inserted into the mounting panel aperture without the dogleg tab striking or otherwise interfering with the panel. After the device is inserted into the panel aperture, a fastener attached to the dogleg tab can be engaged from the outer side of the panel to move the dogleg tab into the engagement position on the inner side of the panel. The fastener can then be further engaged to cause the dogleg tab to move toward the inner side of the panel to cause the device to be clamped to the panel between the dogleg tab on the inner side of the panel and a face flange of the device housing on the outer side of the panel.

When shipping and installing these types of devices, the doglegs are typically tightened slightly within their retracted positions to keep them from swinging outward until the screws are being tightened to actuate the dogleg mechanism. One problem that can occur when tightening the screw at installation is that the dogleg can bind within its recess until loosened to unbind it and then retightened to actuate the dogleg mechanism. Another problem is when uninstalling the product, the doglegs should end up fully retracted and should stay this way as the other doglegs are dealt with, but instead they are loose and may wiggle out of the retracted position or, in some situations, gravity will constantly pull them out which makes proper product removal very difficult.

The present inventor(s) have recognized that, inter alia, application of friction between the device housing to which the dogleg screw fixation mechanism is attached and the fastener of the dogleg mechanism can inhibit the dogleg from freely swinging into and out of the engagement and/or retracted positions. To secure the dogleg tab of the fixation mechanism in this manner the friction device can cause a friction force between the fixation fastener and the friction device that is equal to or greater than a target threshold, including, e.g., a threshold that is greater than the weight of the dogleg tab. The friction device/method should be durable to last for many in/out cycles and over many years without significant loss of function. The friction device/method should provide a proper and consistent amount of friction to improve the user experience with the product for which the friction device is employed.

Another method to attempt to retain the dogleg involves friction between the dogleg and the recessed area of the product to retain it. This requires that the swinging/twisting of the dogleg to be strong enough to overcome the retention friction.

Some devices that include a dogleg fixation mechanism include a friction fit retention feature that is meant to retain the dogleg tab in the retracted position. Additionally, it is not uncommon for threads in the dogleg tab to wear quickly and loose friction with the threaded fastener attached thereto. However, when the threads between the fastener and dogleg tab are stripped (for example from wear over time), it may be difficult or impossible to disengage the dogleg tab from the friction fit retention mechanism (or to reengage the dogleg back into the retention mechanism) and therefore difficult or impossible to move the dogleg mechanism into the engagement position to attach the device to the mounting panel (or move the dogleg out of the engagement position and retain it back in the retracted position to remove the device). In such situations, a friction inducing device in accordance with this disclosure can be employed between the fastener and the dogleg tab to ameliorate in part or in whole issues associated with the weakening thread friction described above.

Figure 1B:
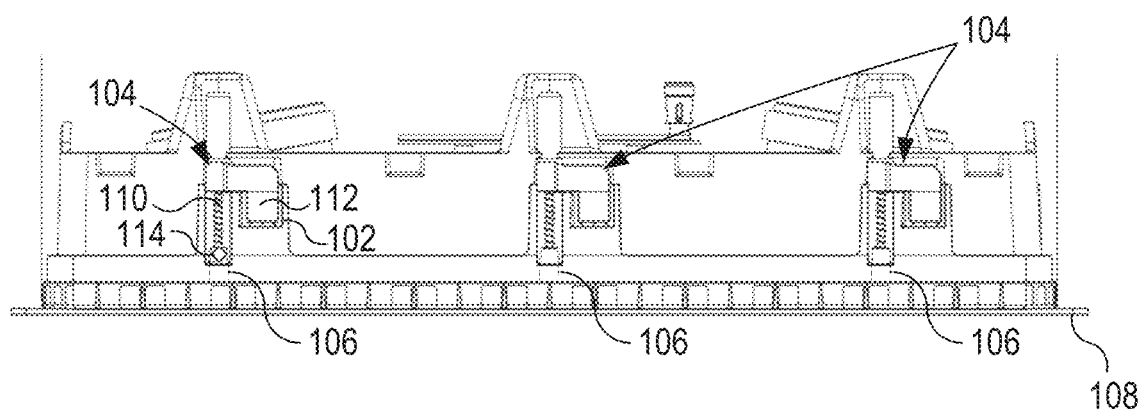
Figure 1C:
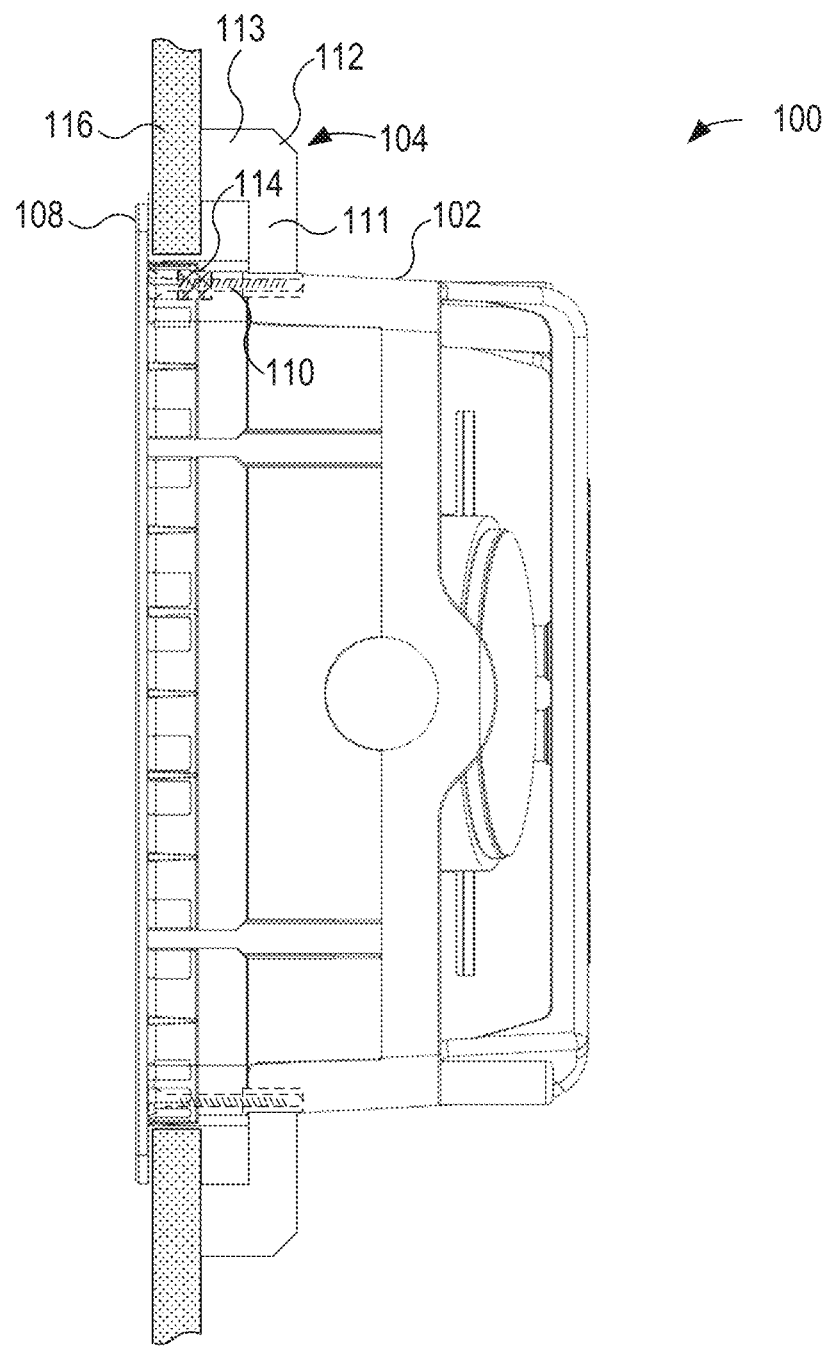

FIGS. 1A-1C depict an example device 100, which, in this example, is a wall or ceiling mounted speaker configured to be mounted to a planar mounting panel. Speaker 100 includes housing 102 and dogleg fixation mechanism 104. Housing 102 is configured to be received in an aperture in the mounting panel, including, for example, an aperture cut into a drywall or other material wall or ceiling. Housing 102 includes a plurality of housing apertures 106 and face flange 108, which extends outward around part or all of the periphery of the housing.

Each dogleg mechanism 104 includes fastener 110, dogleg tab 112, and elastomeric gasket 114. An elastomeric gasket is one example of a friction inducing member in accordance with this disclosure. Fastener 110 is disposed in housing aperture 106. Dogleg tab 112 is operatively coupled to one end of fastener 110. Dogleg tab 112 can include a general "L" shape with a lateral flange 111 extending approximately perpendicular from fastener 108 and a longitudinal flange 113 extending perpendicular from the lateral flange and parallel to the fastener. Dogleg tab 112 is configured to be disposed in a retracted position (shown in FIGS. 1A and 1B) and to be disposed in an engagement position (shown in FIG. 1C), in which engagement position the dogleg tab is disposed to engage an inside surface of the mounting panel to which speaker 100 is mounted.

Elastomeric gasket 114 is fixedly attached to housing 102 adjacent housing aperture 106 and friction-fit to fastener 110. In an example, elastomeric gasket 114 can be threadably engaged by fastener 110. In the example of FIGS. 1A-1C, gasket 114 is disposed within housing aperture 106. Gasket 114 may be fixed to housing 102 in a variety of ways, including friction-fitting the gasket into aperture 102 and/or adhering the gasket therein. In examples, the outer diameter of gasket 114 is greater than an inner diameter of housing aperture 110. Gasket 114 may be, for example, a cylindrical plug type gasket or other shape that matches the profile of housing aperture 102 such that gasket 114 may be received therein and plug a portion (for example, end) of the aperture. Additional examples and details of a friction inducing gasket in accordance with this disclosure is described below with reference to FIGS. 2-5.

FIG. 1C depicts speaker device 100 attached to planar mounting panel 116 with dogleg tab 112 of dogleg mechanism 104 in an engagement position (shown in FIG. 1C), in which engagement position the dogleg tab engages the inside surface of mounting panel 116 to clamp device 100 to panel 116 between tab 112 and housing peripheral face flange 108. Elastomeric gasket 114 is configured to inhibit dogleg tab 112 from freely swinging into and out of the engagement and/or retracted positions. For example, in the orientation illustrated in FIG. 1C with device 100 mounted to a vertical wall, if dogleg tab 112 becomes disengaged from a retention mechanism or no retention mechanism is included in device 100, dogleg tab 112 on the lower part of device 100 may swing into the engagement position when an installer attempts to insert device 100 into the aperture in panel 116. The same issue with the position of dogleg tab 112 could also occur during an uninstallation of device 100, making it difficult to remove device 100 from panel 116. Elastomeric gasket 114 can, however, inhibit dogleg tab 112 from freely swinging into and out of the engagement and/or retracted positions to assist in installation, uninstallation, and/or retrofitting of device 100 in the aperture of panel 116. In an example, elastomeric gasket 114 can be configured to cause a friction force between fastener 110 and gasket 114 that is equal to or greater than a target threshold, including a threshold that is greater than the weight of dogleg tab 112.

Figure 2:
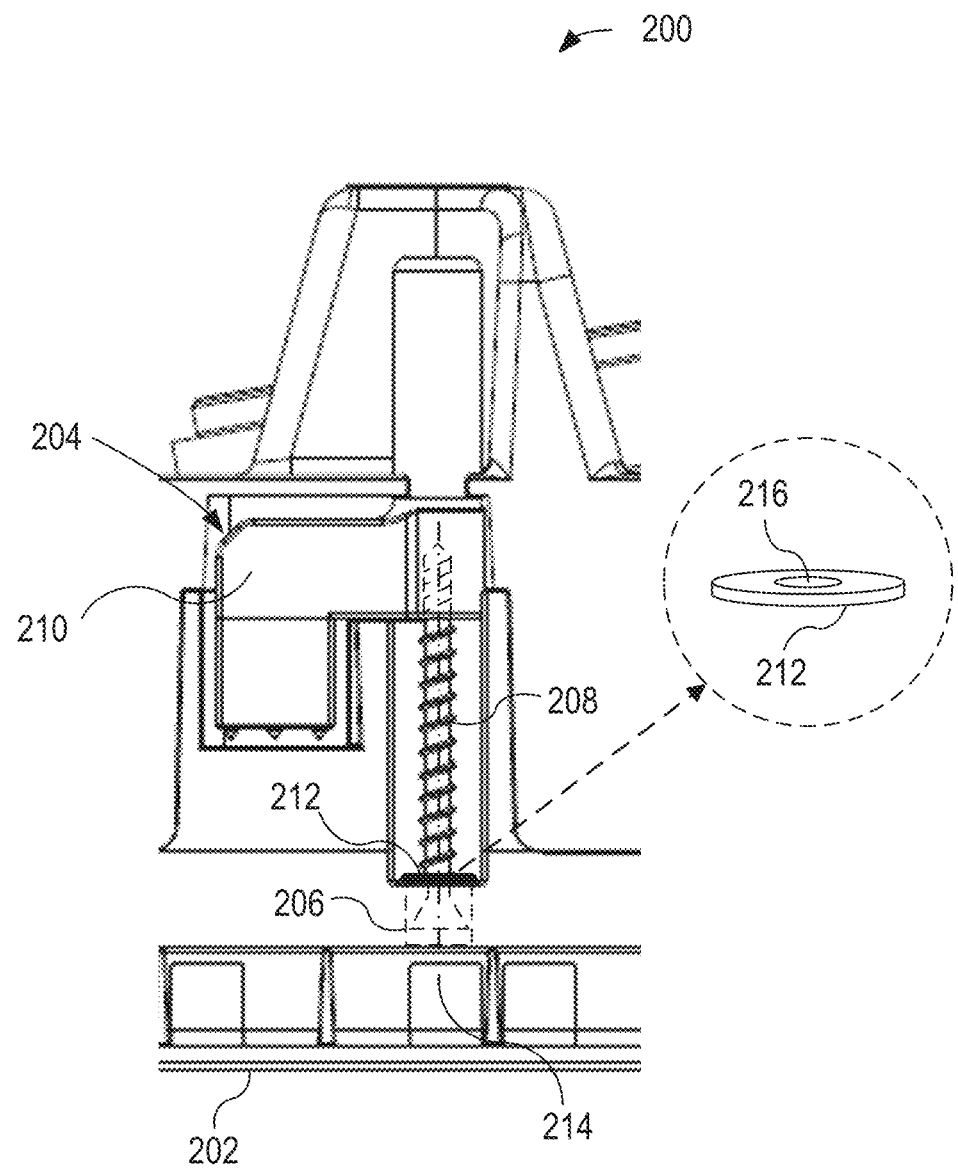
FIG. 2 depicts another example device configured to be mounted to a planar mounting panel.

FIG. 2 depicts a partial view of another example device 200, which may be, for example, a wall or ceiling mounted speaker configured to be mounted to a planar mounting panel in a similar manner as the example of FIGS. 1A-1C. Device 200 includes housing 202 and dogleg fixation mechanism 204. Housing 202 is configured to be received in an aperture in the mounting panel, including, for example, an aperture cut into a drywall or other material wall or ceiling. Housing 202 includes housing aperture 206, through which threaded fastener 208 of dogleg mechanism 204 is arranged.

Each dogleg mechanism 204 includes fastener 208, dogleg tab 210, and elastomeric gasket 212. Fastener 208 is disposed in housing aperture 206. Dogleg tab 210 is operatively coupled to one end of fastener 208. Dogleg tab 210 is configured to be disposed in a retracted position (shown in FIG. 2) and to be disposed in an engagement position, in which engagement position the dogleg tab is disposed to engage an inside surface of the mounting panel to which example device 200 is mounted.

Elastomeric gasket 212 is fixedly attached to housing 202 adjacent housing aperture 206 and friction-fit to fastener 208. In an example, gasket 212 is threadably engaged by fastener 208. In the example of FIG. 2, gasket 212 is disposed outside one end of housing aperture 206. Gasket 212 is axially aligned with housing aperture 206 along central axis 214. Gasket 212 may be fixed to housing 202 in a variety of ways, including adhering the gasket to the housing.

As depicted in the partial and detail views of FIG. 2, example elastomeric gasket 212 is flat ring-type gasket, which includes a minor cylindrical peripheral surface connected to major circular surfaces. In this example, elastomeric gasket 212 includes through hole 216. In an example, through hole 216 is a pilot hole for receiving fastener 208 and has an inner diameter that is smaller than an outer diameter of fastener 208. For example, the inner diameter of the pilot hole 216 in gasket 212 can be less than the outer diameter of the threads of fastener 208. In other examples, however, gasket 212 (and other elastomeric gaskets in accordance with this disclosure) may not include a pilot/through hole for receiving a fastener of a dogleg mechanism, and, instead, the fastener may be driven through the gasket to friction-fit the gasket to the fastener.

Example device 200 including elastomeric gasket 212 may function in a similar manner as the example of FIGS. 1A-1C to assist in installation, uninstallation, and/or retrofitting of device 200 in an aperture in a planar mounting panel. For example, elastomeric gasket 212 is configured to inhibit dogleg tab 210 from freely swinging into and out of the engagement and/or retracted positions. For example, in a vertically oriented panel mount, if dogleg tab 210 becomes disengaged from a retention mechanism or no retention mechanism is included in device 200, dogleg tab 210 may swing into the engagement position when an installer attempts to mount device 200 to a vertically oriented mounting panel. The same issue with the position of dogleg tab 210 could also occur during an uninstallation of device 200, making it difficult to remove the device from the panel for service, replacement, upgrades, etc. Elastomeric gasket 212 can, however, inhibit dogleg tab 210 from freely swinging into and out of the engagement and/or retracted positions. In an example, elastomeric gasket 212 can be configured to cause a friction force between fastener 208 and gasket 212 that is equal to or greater than a target threshold, including a threshold that is greater than the weight of dogleg tab 210.

Figure 3:
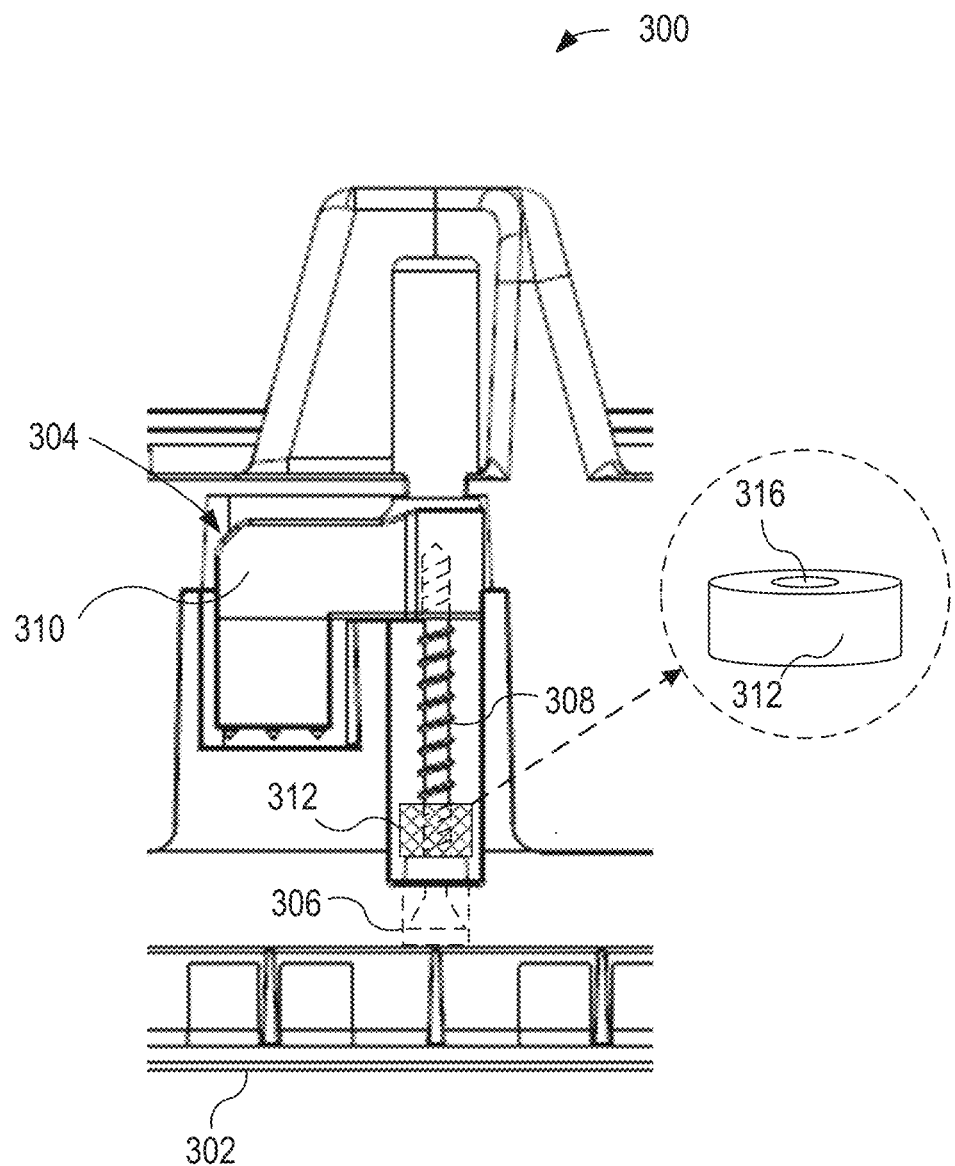
FIG. 3 depicts another example device configured to be mounted to a planar mounting panel.

FIG. 3 depicts a partial view of another example device 300, which may be, for example, a wall or ceiling mounted speaker configured to be mounted to a planar mounting panel in a similar manner as the example of FIGS. 1A-1C. Device 300 includes housing 302 and dogleg fixation mechanism 304. Housing 302 is configured to be received in an aperture in the mounting panel, including, for example, an aperture cut into a drywall or other material wall or ceiling. Housing 302 includes housing aperture 306, through which threaded fastener 308 of dogleg mechanism 304 is arranged.

Each dogleg mechanism 304 includes fastener 308, dogleg tab 310, and elastomeric gasket 312. Fastener 308 is disposed in housing aperture 306. Dogleg tab 310 is operatively coupled to one end of fastener 308. Dogleg tab 310 is configured to be disposed in a retracted position (shown in FIG. 3) and to be disposed in an engagement position, in which engagement position the dogleg tab is disposed to engage an inside surface of the mounting panel to which example device 300 is mounted.

Elastomeric gasket 312 is fixedly attached to housing 302 adjacent housing aperture 306 and friction-fit to fastener 308. In an example, gasket 312 is threadably engaged by fastener 308. In the example of FIG. 3, gasket 312 is disposed outside one end of housing aperture 306. Gasket 312 may be axially aligned with housing aperture 306 along a central axis. Gasket 312 may be fixed to housing 302 in a variety of ways, including adhering the gasket to the housing.

As depicted in the partial and detail views of FIG. 3, example elastomeric gasket 312 is cylindrical cap type gasket, which includes a major cylindrical peripheral surface connected to major circular surface(s) at the end(s) thereof. In this example, elastomeric gasket 312 includes through hole 316. In an example, through hole 316 is a pilot hole for receiving fastener 308 and has an inner diameter that is smaller than an outer diameter of fastener 308. For example, the inner diameter of the pilot hole 316 in gasket 312 can be less than the outer diameter of the threads of fastener 308. In other examples, however, gasket 312 (and other elastomeric gaskets in accordance with this disclosure) may not include a pilot/through hole for receiving a fastener of a dogleg mechanism, and, instead, the fastener may be driven through the gasket to friction-fit the gasket to the fastener.

Example device 300 including elastomeric gasket 312 may function in a similar manner as the example of FIGS. 1A-1C to assist in installation, uninstallation, and/or retrofitting of device 300 in an aperture in a planar mounting panel. For example, elastomeric gasket 312 is configured to inhibit dogleg tab 310 from freely swinging into and out of the engagement and/or retracted positions. For example, in a vertically oriented panel mount, if dogleg tab 310 becomes disengaged from a retention mechanism or no retention mechanism is included in device 300, dogleg tab 310 may swing into the engagement position when an installer attempts to mount device 300 to a vertically oriented mounting panel. The same issue with the position of dogleg tab 310 could also occur during an uninstallation of device 300, making it difficult to remove the device from the panel for service, replacement, upgrades, etc. Elastomeric gasket 312 can, however, inhibit dogleg tab 310 from freely swinging into and out of the engagement and/or retracted positions. In an example, elastomeric gasket 312 can be configured to cause a friction force between fastener 308 and gasket 312 that is equal to or greater than a target threshold, including a threshold that is greater than the weight of dogleg tab 310.

Figure 4:
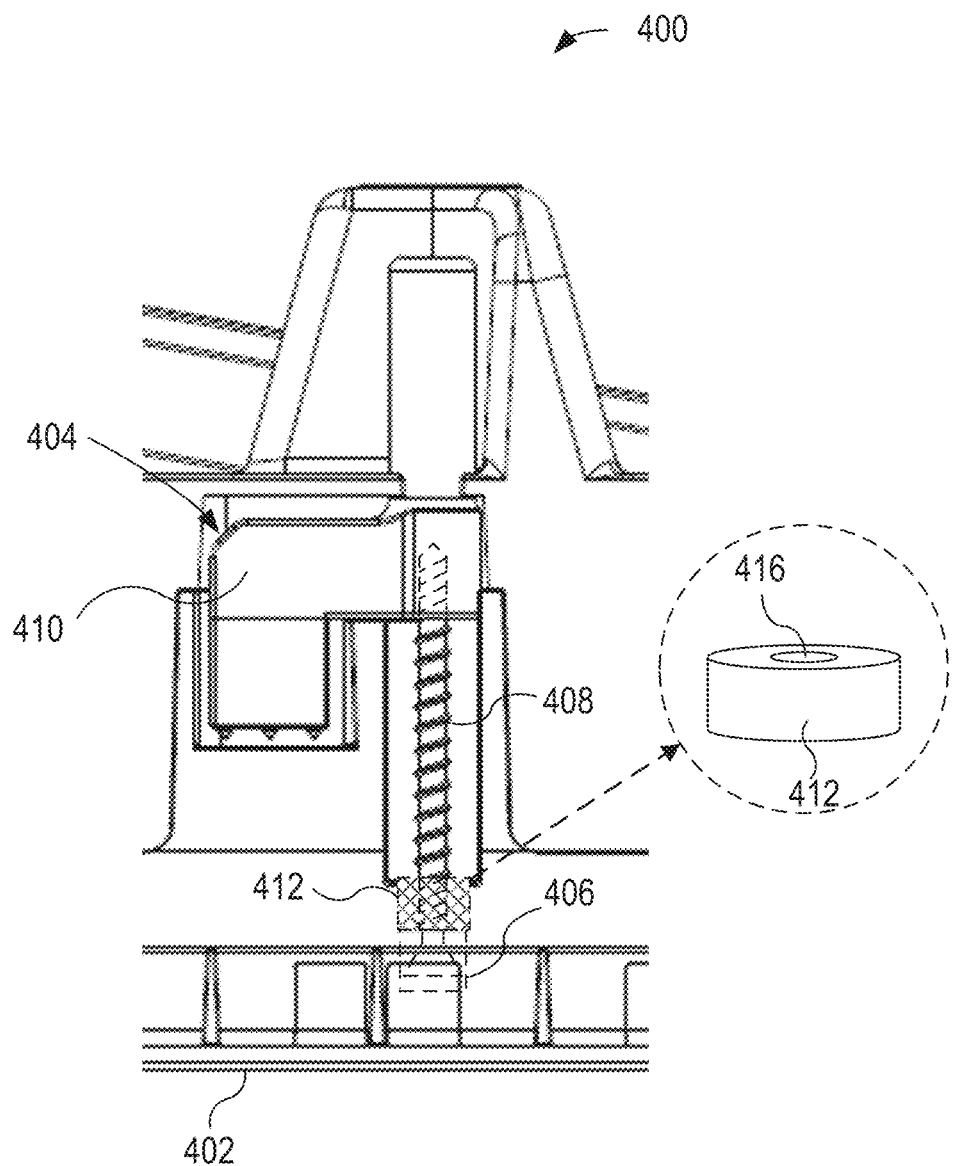
FIG. 4 depicts another example device configured to be mounted to a planar mounting panel.

FIG. 4 depicts a partial view of another example device 400, which may be, for example, a wall or ceiling mounted speaker configured to be mounted to a planar mounting panel in a similar manner as the example of FIGS. 1A-1C. Device 400 includes housing 402 and dogleg fixation mechanism 404. Housing 402 is configured to be received in an aperture in the mounting panel, including, for example, an aperture cut into a drywall or other material wall or ceiling. Housing 402 includes housing aperture 406, through which threaded fastener 408 of dogleg mechanism 404 is arranged.

Each dogleg mechanism 404 includes fastener 408, dogleg tab 410, and elastomeric gasket 412. Fastener 408 is disposed in housing aperture 406. Dogleg tab 410 is operatively coupled to one end of fastener 408. Dogleg tab 410 is configured to be disposed in a retracted position (shown in FIG. 4) and to be disposed in an engagement position, in which engagement position the dogleg tab is disposed to engage an inside surface of the mounting panel to which example device 400 is mounted.

Elastomeric gasket 412 is fixedly attached to housing 402 adjacent housing aperture 406 and friction-fit to fastener 408. In an example, gasket 412 is threadably engaged by fastener 408. In the example of FIG. 4, gasket 412 is disposed within housing aperture 406. Gasket 412 may be axially aligned with housing aperture 406 along a central axis. Gasket 412 may be fixed to housing 402 in a variety of ways, including press fitting within and/or adhering the gasket to housing aperture 406.

As depicted in the partial and detail views of FIG. 4, example elastomeric gasket 412 is cylindrical plug type gasket, which is affixed to housing 402 within housing aperture 406, and which includes a major cylindrical peripheral surface connected to two major circular surfaces at the ends thereof. In this example, elastomeric gasket 412 includes through hole 416. In an example, through hole 416 is a pilot hole for receiving fastener 408 and has an inner diameter that is smaller than an outer diameter of fastener 408. For example, the inner diameter of the pilot hole 416 in gasket 412 can be less than the outer diameter of the threads of fastener 408. In other examples, however, gasket 412 (and other elastomeric gaskets in accordance with this disclosure) may not include a pilot/through hole for receiving a fastener of a dogleg mechanism, and, instead, the fastener may be driven through the gasket to friction-fit the gasket to the fastener.

Example device 400 including elastomeric gasket 412 may function in a similar manner as the example of FIGS. 1A-1C to assist in installation, uninstallation, and/or retrofitting of device 400 in an aperture in a planar mounting panel. For example, elastomeric gasket 412 is configured to inhibit dogleg tab 410 from freely swinging into and out of the engagement and/or retracted positions. For example, in a vertically oriented panel mount, if dogleg tab 410 becomes disengaged from a retention mechanism or no retention mechanism is included in device 400, dogleg tab 410 may swing into the engagement position when an installer attempts to mount device 400 to a vertically oriented mounting panel. The same issue with the position of dogleg tab 410 could also occur during an uninstallation of device 400, making it difficult to remove the device from the panel for service, replacement, upgrades, etc. Elastomeric gasket 412 can, however, inhibit dogleg tab 410 from freely swinging into and out of the engagement and/or retracted positions. In an example, elastomeric gasket 412 can be configured to cause a friction force between fastener 408 and gasket 412 that is equal to or greater than a target threshold, including a threshold that is greater than the weight of dogleg tab 410.

Figure 5:
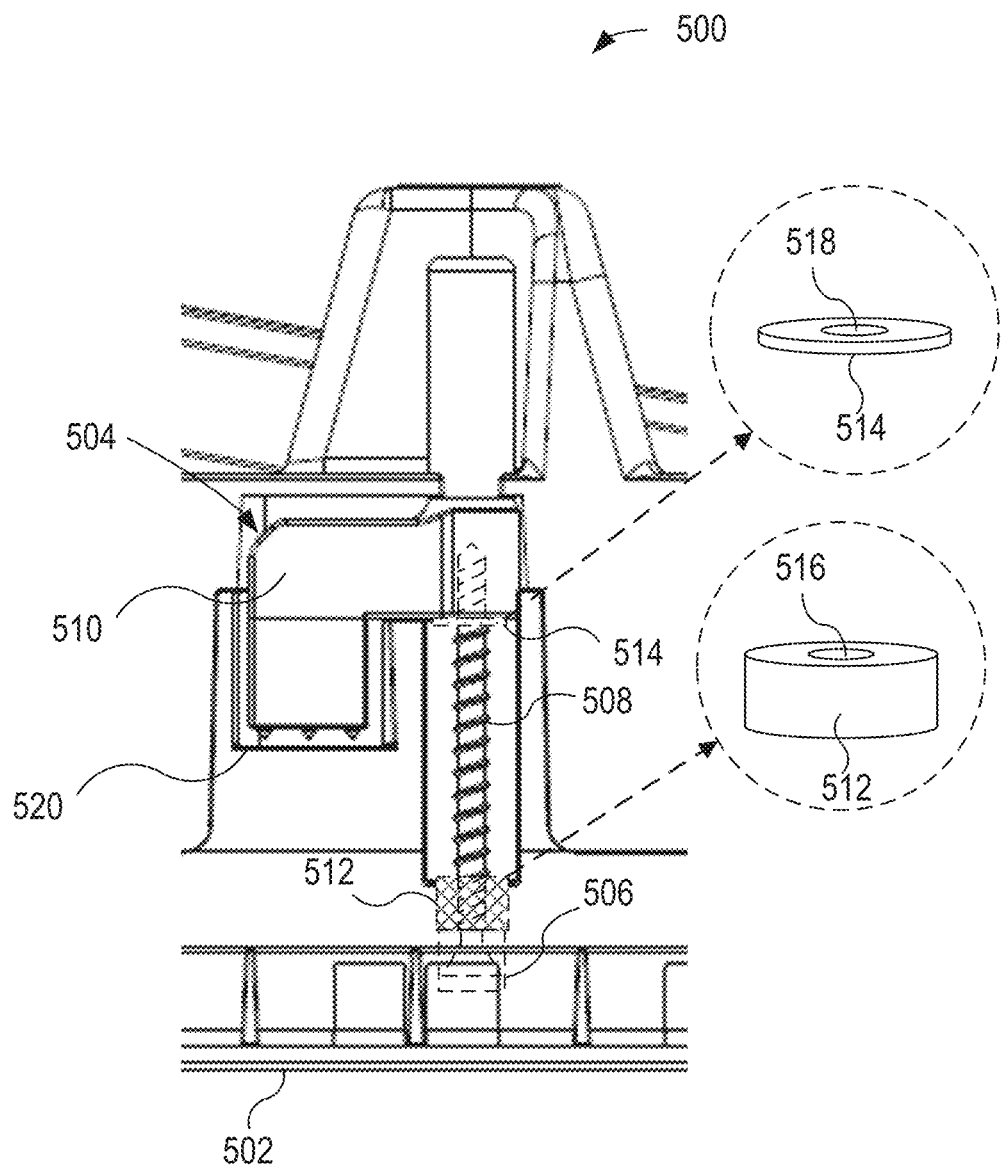
FIG. 5 depicts another example device configured to be mounted to a planar mounting panel.

FIG. 5 depicts a partial view of another example device 500, which may be, for example, a wall or ceiling mounted speaker configured to be mounted to a planar mounting panel in a similar manner as the example of FIGS. 1A-1C. Device 500 includes housing 502 and dogleg fixation mechanism 504. Housing 502 is configured to be received in an aperture in the mounting panel, including, for example, an aperture cut into a drywall or other material wall or ceiling. Housing 502 includes housing aperture 506, through which fastener 508 of dogleg mechanism 504 is arranged.

Example device 500 is the same as example device 400, except that dogleg mechanism 504 includes two friction inducing elastomeric gaskets, one of which is affixed to housing 502 and the other of which is affixed to a dogleg tab of dogleg mechanism 504. In FIG. 5, each dogleg mechanism 504 includes fastener 508, dogleg tab 510, first elastomeric gasket 512 and second elastomeric gasket 514. Fastener 508 is disposed in housing aperture 506. Dogleg tab 510 is operatively coupled to one end of fastener 508. Dogleg tab 510 is configured to be disposed in a retracted position (shown in FIG. 5) and to be disposed in an engagement position, in which engagement position the dogleg tab is disposed to engage an inside surface of the mounting panel to which example device 500 is mounted.

Elastomeric gasket 512 is fixedly attached to housing 502 adjacent housing aperture 506 and friction-fit to fastener 508. In an example, gasket 512 is threadably engaged by fastener 508. In the example of FIG. 5, gasket 512 is disposed within housing aperture 506. Gasket 512 may be axially aligned with housing aperture 506 along a central axis. Gasket 512 may be fixed to housing 502 in a variety of ways, including press fitting within and/or adhering the gasket to housing aperture 506.

As depicted in the partial and detail views of FIG. 5, first elastomeric gasket 512 is cylindrical plug type gasket, which is affixed to housing 502 within housing aperture 506, and which includes a major cylindrical peripheral surface connected to two major circular surfaces at the ends thereof. In this example, first gasket 512 includes through hole 516. In an example, through hole 516 is a pilot hole for receiving fastener 508 and has an inner diameter that is smaller than an outer diameter of fastener 508. For example, the inner diameter of the pilot hole 516 in first gasket 512 can be less than the outer diameter of the threads of fastener 508. In other examples, however, first gasket 512 (and other elastomeric gaskets in accordance with this disclosure) may not include a pilot/through hole for receiving a fastener of a dogleg mechanism, and, instead, the fastener may be driven through the gasket to friction-fit the gasket to the fastener.

Second gasket 514 is fixedly attached to dogleg 510 adjacent dogleg aperture and friction-fit to fastener 508. In an example, second gasket 514 is threadably engaged by fastener 508. In the example of FIG. 5, gasket 514 is affixed to one end of dogleg tab 510 to which an end of fastener 508 is operatively coupled. Gasket 514 may be axially aligned with dogleg aperture and fastener 508 along a central axis. Gasket 514 may be fixed to dogleg 510 in a variety of ways, including adhering the gasket to the dogleg.

Second elastomeric gasket 514 is flat ring-type gasket, which includes a minor cylindrical peripheral surface connected to major circular surfaces. In this example, second elastomeric gasket 514 includes through hole 518. In an example, through hole 518 is a pilot hole for receiving fastener 508 and has an inner diameter that is smaller than an outer diameter of fastener 508. For example, the inner diameter of the pilot hole 518 in second gasket 514 can be less than the outer diameter of the threads of fastener 508. In other examples, however, second gasket 514 (and other elastomeric gaskets in accordance with this disclosure) may not include a pilot/through hole for receiving a fastener of a dogleg mechanism, and, instead, the fastener may be driven through the gasket to friction-fit the gasket to the fastener.

In the example of FIG. 5, first and second elastomeric gaskets 512 and 514 are different, i.e. first gasket 512 is a cylindrical plug-type gasket affixed, e.g., press-fit within housing aperture 506 and second gasket 514 is a flat ring-type gasket, e.g., adhered to one end of dogleg tab 510. However, in other examples including a plurality of friction inducing gaskets in accordance with this disclosure, the gaskets may be the same.

First elastomeric gasket 512 is configured to inhibit dogleg tab 510 from freely swinging into and out of the engagement and/or retracted positions. For example, in a vertically oriented panel mount, if dogleg tab 510 becomes disengaged from a retention mechanism or no retention mechanism is included in device 500, dogleg tab 510 may swing into the engagement position when an installer attempts to mount device 500 to a vertically oriented mounting panel. The same issue with the position of dogleg tab 510 could also occur during an uninstallation of device 500, making it difficult to remove the device from the panel for service, replacement, upgrades, etc. First elastomeric gasket 512 can, however, inhibit dogleg tab 510 from freely swinging into and out of the engagement and/or retracted positions. In an example, first gasket 512 can be configured to cause a friction force between fastener 508 and first gasket 512 that is equal to or greater than a target threshold, including a threshold that is greater than the weight of dogleg tab 510.

Second elastomeric gasket 514 may be configured to enable dogleg tab 510 of dogleg mechanism 504 to be repeatedly moved into and out of the retracted position. Housing 502 includes recess 520 that is sized and shaped to receive and surround portions of dogleg tab 510. Recess 520 or another part of housing 502 may be configured as a retention mechanism to retain dogleg tab 510 in a retracted position. For example, a portion of the outer surfaces of dogleg tab 510 may be oversized relative to the size of recess 520 such that dogleg tab 510 is press-fit into the recess in housing 502. As an example, recess 520 can include a flange, tab, boss, rib or other protrusion that extends from an inner peripheral surface of recess 520 and dogleg tab 510 can include a flange, tab, boss, rib or other protrusion that extends from an outer peripheral surface of dogleg tab 510, which complimentary protrusions are arranged and configured to interfere when dogleg tab 510 is pushed into the retracted position in recess 520, thereby securing dogleg tab 510 in recess 520 with a press/friction fit.

In some cases, threads in dogleg tab 510 that receive threaded fastener 508 may wear quickly and loose friction with the fastener. For example, it may not be uncommon for a plastic dogleg threads to wear quickly and loose friction with a metal screw. In such cases, the loss of friction between fastener 508 and dogleg tab 510 may cause the dogleg tab to be unable to overcome the retention friction within recess 520 when trying to fully swing the dogleg tab into or out of the retracted position within the recess. However, second elastomeric gasket 514 may be configured to enable dogleg tab 510 of dogleg mechanism 504 to be repeatedly moved into and out of the retracted position by inducing friction between gasket 514 and fastener 508 that is greater than the friction/force of the retention mechanism of recess 520 and/or housing 502.

In the foregoing examples, a number of example elastomeric gaskets are described and depicted as cylindrical. In some examples, a friction inducing elastomeric gasket in accordance with this disclosure can be a circular cylindrical gasket, as depicted the examples of FIGS. 2-5. In other examples, however, a differently shaped friction inducing elastomeric gasket can be employed, including a square or rectangular cylindrical gasket with rectilinear end faces/surfaces and a corresponding rectilinear side surface. As another example, the end faces/surfaces of an example gasket need not be orthogonal to the side face(s)/surface(s) thereof and an example gasket could be, e.g., pyramidal or conical.

In the foregoing examples of FIGS. 2-5, the friction inducing member is described and depicted as an elastomeric gasket. In other examples, however, a friction inducing member may be another type of component or feature. FIGS. 6A-10 depict additional examples of friction inducing members in accordance with this disclosure.

Figure 6A:
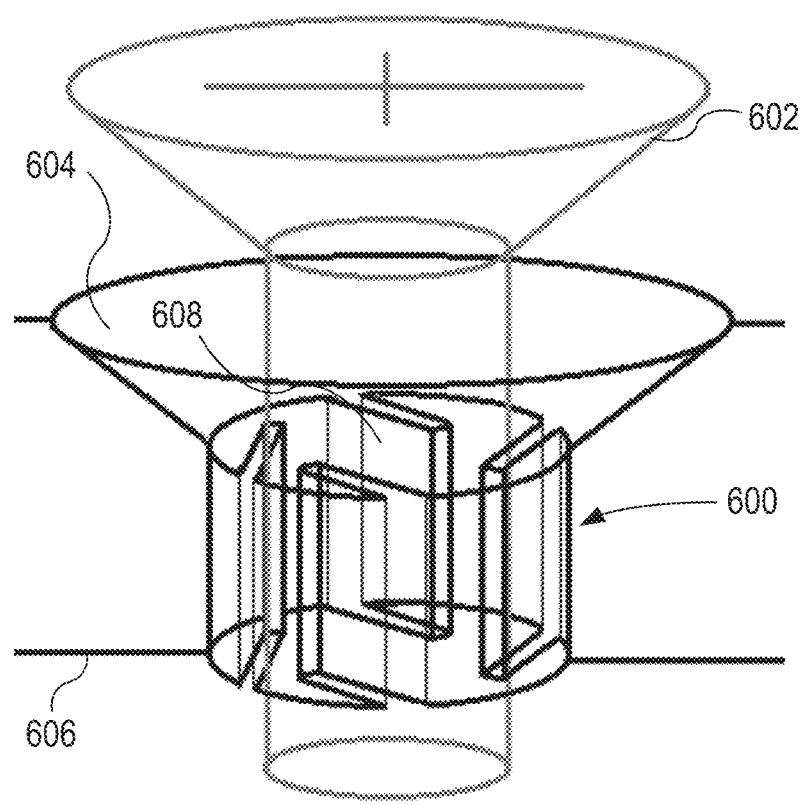
FIGS. 6A and 6B depict an example friction inducing member of a device configured to be mounted to a planar mounting panel.
Figure 6B:
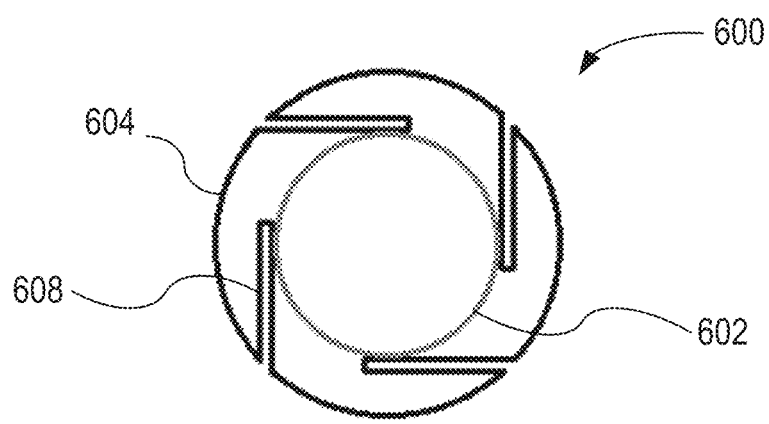
Figure 7:
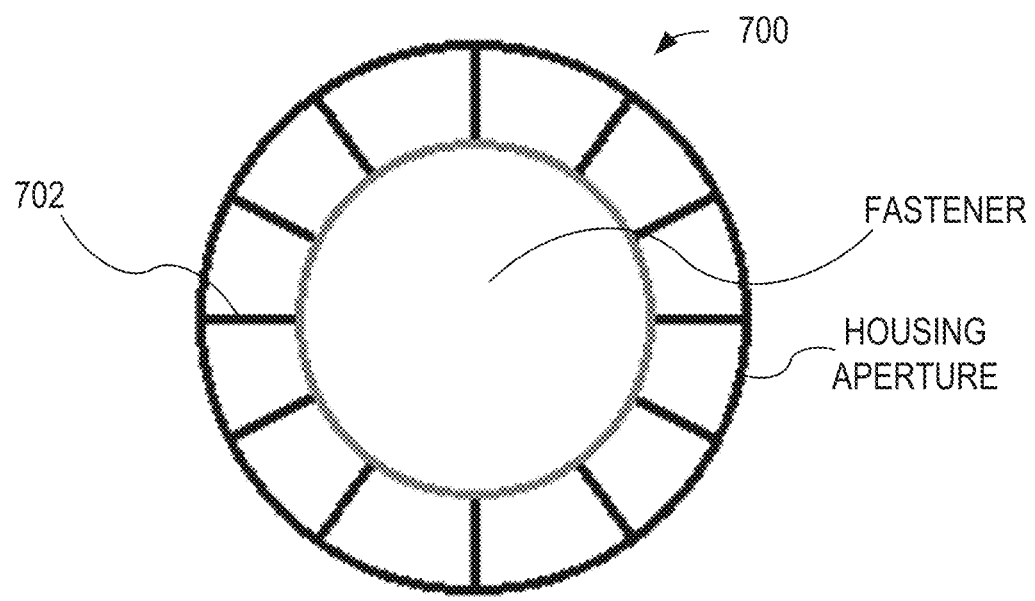
FIG. 7 depicts another example friction inducing member of a device configured to be mounted to a planar mounting panel.
Figure 8:
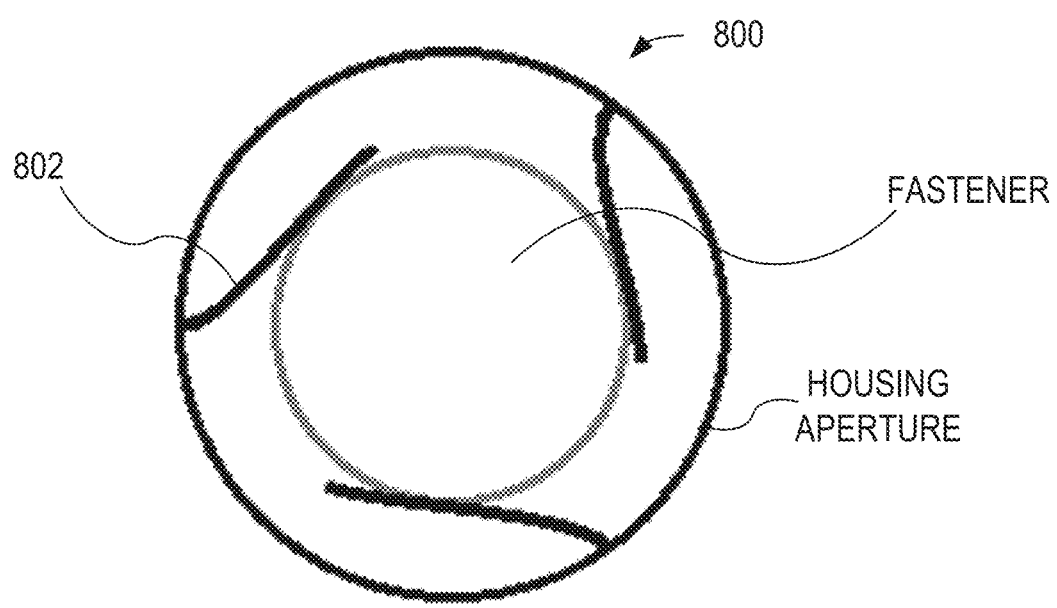
FIG. 8 depicts another example friction inducing member of a device configured to be mounted to a planar mounting panel.

FIGS. 6A and 6B are perspective and plan views of example friction inducing element 600, which may be used in the installation of a device configured to be mounted to a planar mounting panel. In FIGS. 6A and 6B, fastener 602 is disposed in aperture 604 in housing 606 of a device configured to be mounted to a planar mounting panel. Friction inducing member 600 includes one or more protrusions extending inwardly within aperture 604 of housing 606. In the example of FIGS. 6A and 6B, friction inducing member 600 includes a plurality of fins 608, which extend inwardly within aperture 604. Friction inducing member 600 is fixedly attached to or integral with housing 606 and fastener 602 is friction-fit to friction inducing member 600.

Friction inducing member 600 includes four generally straight fins 608. However, in other examples, a friction inducing member can include more or fewer fins. Fins 608 extend inwardly within aperture 604 of housing 602, but do not extend radially inwardly. Instead, fins 608 extend inwardly at a non-right angle to a tangent of the circumference of aperture 604. In other examples, however, a friction inducing member can include one or more fins extending radially inward within an aperture of a device housing, including example friction inducing member 700 of FIG. 7, which includes one or more fins 702. Additionally, in other examples, a friction inducing member in accordance with this disclosure can include non-straight fins, including, for example curved/contoured fins 802 of friction inducing element 800 of FIG. 8.

Figure 9:
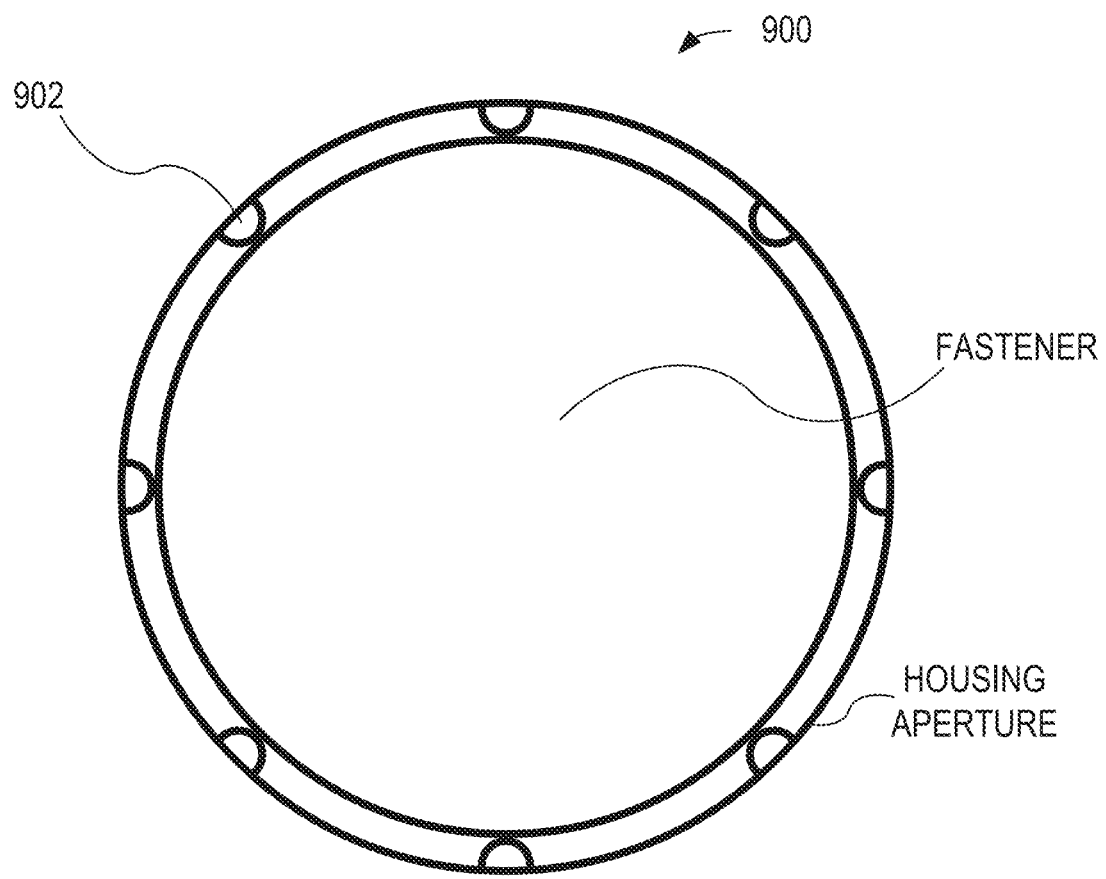
FIG. 9 depicts another example friction inducing member of a device configured to be mounted to a planar mounting panel.

FIG. 9 depicts another example friction inducing member 900 in accordance with this disclosure. In FIG. 9, a fastener is disposed in an aperture in a housing of a device configured to be mounted to a planar mounting panel. Friction inducing member 900 includes one or more protrusions extending inwardly within the aperture. In the example of FIG. 9, friction inducing member 900 includes a plurality of ribs 902, which extend inwardly within aperture and which include a speed-bump-like cross-sectional shape. Friction inducing ribs can be differently shaped in other examples. Friction inducing member 900 is fixedly attached to or integral with the housing and the fastener is friction-fit to ribs 902.

Figure 10:
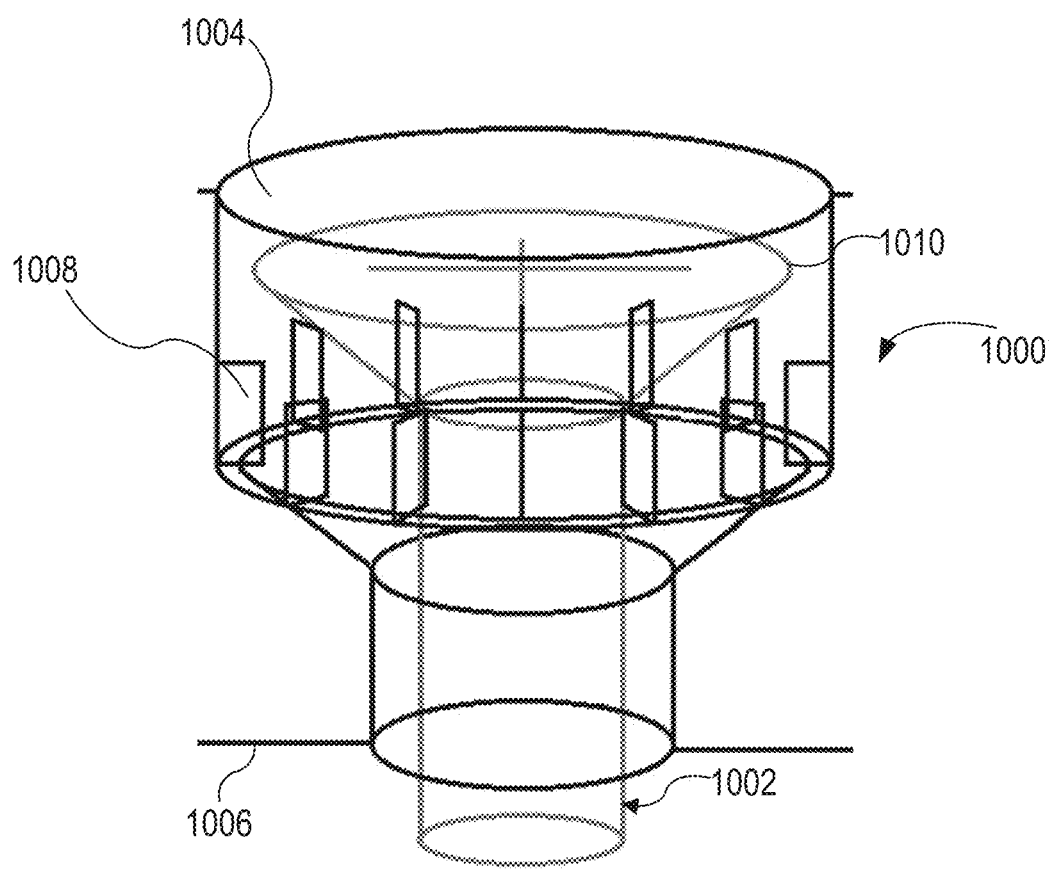
FIG. 10 depicts another example friction inducing member of a device configured to be mounted to a planar mounting panel.

FIG. 10 is a perspective view of example friction inducing element 1000, which may be used in the installation of a device configured to be mounted to a planar mounting panel. In FIG. 10, fastener 1002 is disposed in aperture 1004 in housing 1006 of a device configured to be mounted to a planar mounting panel. Friction inducing member 1000 includes one or more fins 1008 extending inwardly within aperture 1004 of housing 1006. In this example, fins 1008 are disposed in aperture 1004 such that the head 1010 of fastener 1002, instead of the shaft, is friction fit to the fins of friction inducing member 1000.

In FIGS. 6A-10, the dogleg retention mechanism is not shown in full detail. However, these examples including friction inducing members 600, 700, 800, 900 and 1000 can be employed in a similar manner as described above with reference to the examples of FIGS. 2-5 and one end of a fastener can be coupled to a dogleg tab of a dogleg retention mechanism.

Figure 11:
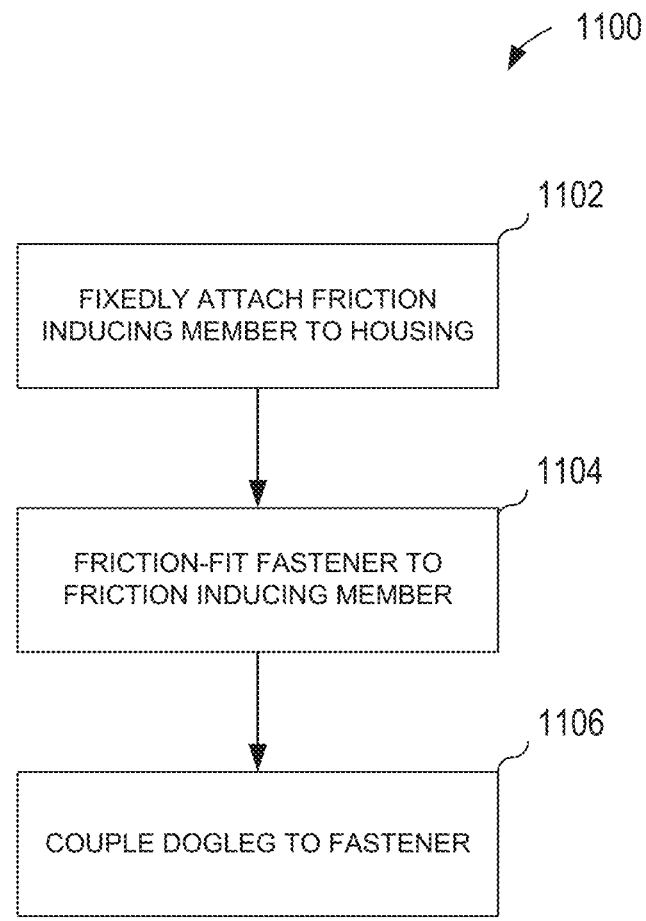
FIG. 11 is a flowchart depicting a method of making a device configured to be mounted to a planar mounting panel.

FIG. 11 is a flowchart depicting an example method 1100 of making a device configured to be mounted to a planar mounting panel. Method 1100 includes fixedly attaching a friction inducing element to a housing of the device adjacent a housing aperture (1102), friction-fitting the friction inducing member and the fastener to one another (1104), and coupling a dogleg tab of a dogleg mechanism to one end of the fastener (1106). The housing is configured to be received in an aperture in the mounting panel. The dogleg tab being configured to be disposed in a retracted position and to be disposed in an engagement position, in which engagement position the dogleg tab is disposed to engage an inside surface of the mounting panel. The example method 1100 is applicable to example devices 100, 200, 300, 400, 500, 600, 700, 800, 900 and 1000 and other example devices in accordance with this disclosure.

In examples according to this disclosure, a force of friction between the fastener and the friction inducing member can be greater than or equal to a threshold force. For example, the threshold friction force between the friction inducing member and the housing can be greater than a weight of the dogleg tab.

In some examples, the friction-inducing member includes a first elastomeric gasket and example method 1100 and also includes fixedly attaching a second elastomeric gasket to the dogleg tab. The second gasket is friction-fit to the fastener. In examples, a force of friction between the fastener and the second gasket is greater than or equal to a threshold force. For example, the threshold force between the second gasket and the fastener is greater than a retention force between the dogleg tab and a dogleg retention mechanism configured to retain the dogleg tab in the retracted position.

Example friction inducing members according to this disclosure may be fabricated from a variety of materials, using a variety of manufacturing methods and may be formed in a variety of shapes depending upon the intended application. For example, friction inducing elastomeric gaskets in accordance with this disclosure may be formed in a non-circular cylindrical shape such as a conical, elliptical or rectangular shape. Elastomeric gaskets may be fabricated from a variety of elastomers, including, e.g., nylon and rubber (natural and/or synthetic rubber). As another example, friction inducing fins and/or ribs can be fabricated from a variety of materials, including elastomers and can be molded or cast integral with a device housing, can be overmolded to a device housing, or can be fabricated by another technique/method appropriate for the desired application.

Notes & Examples

The present application provides for the following exemplary embodiments or examples, the numbering of which is not to be construed as designating levels of importance:

Example 1 provides a device configured to be mounted to a planar mounting panel, the device comprising: a housing configured to be received in an aperture in the mounting panel, the housing comprising a housing aperture; a threaded fastener disposed in the housing aperture; a dogleg tab operatively coupled to one end of the fastener, the dogleg tab configured to be disposed in a retracted position and to be disposed in an engagement position, in which engagement position the dogleg tab is disposed to engage an inside surface of the mounting panel; and a friction inducing member fixedly attached to the housing adjacent the housing aperture and friction-fit to the fastener.

Example 2 provides the device of Example 1 and optionally wherein a force of friction between the fastener and the friction inducing member is greater than or equal to a threshold force.

Example 3 provides the device of Example 2 and optionally wherein the threshold force is greater than a weight of the dogleg tab.

Example 4 provides the device of any one of Examples 1-3 and optionally wherein the friction inducing member is fixedly attached to the housing with an adhesive.

Example 5 provides the device any one of Examples 1-4 and optionally wherein the friction inducing member is disposed within the housing aperture.

Example 6 provides the device of Example 5 and optionally wherein the friction inducing member comprises a gasket.

Example 7 provides the device of Example 1 and optionally wherein an outer diameter of the gasket is greater than an inner diameter of the housing aperture.

Example 8 provides the device of Example 6 or Example 7 and optionally wherein the gasket comprises a cylindrical plug gasket disposed within the housing aperture.

Example 9 provides the device any one of Examples 6-8 and optionally wherein the elastomeric gasket is a first elastomeric gasket and further comprising a second elastomeric gasket, the second elastomeric gasket fixedly attached to the dogleg tab and friction-fit to the fastener.

Example 10 provides the device of Example 9 and optionally wherein a force of friction between the fastener and the second gasket is greater than or equal to a threshold force.

Example 11 provides the device of Example 10 and optionally wherein the threshold force is greater than a retention force between the dogleg tab and a dogleg retention mechanism configured to retain the dogleg tab in the retracted position.

Example 12 provides the device any one of Examples 5-11 and optionally wherein the friction inducing member comprises one or more protrusions extending inwardly within the housing aperture.

Example 13 provides the device of Example 12 and optionally wherein the one or more protrusions comprises one or more fins extending inwardly from an inner surface of the housing aperture.

Example 14 provides the device of Example 12 or Example 13 and optionally wherein the one or more protrusions comprises one or more ribs disposed on an inner surface of the housing aperture.

Example 15 provides the device any one of Examples 1-14 and optionally wherein the friction inducing member comprises a gasket comprising a gasket aperture, which gasket aperture is friction-fit to the fastener.

Example 16 provides the device of Example 15 and optionally wherein the gasket aperture comprises an inner diameter and the fastener comprises an outer diameter, the inner diameter of the gasket aperture being less than the outer diameter of the fastener.

Example 17 provides the device any one of Examples 1-16 and optionally wherein the friction inducing member comprises a gasket axially aligned with the housing aperture.

Example 18 provides the device any one of Examples 1-17 and optionally wherein the dogleg tab comprises: a lateral flange extending approximately perpendicular from the fastener; and a longitudinal flange extending perpendicular from the lateral flange and parallel to the fastener.

Example 19 provides the device any one of Examples 1-18 and optionally wherein the friction inducing member comprises a cylindrical cap gasket fixedly attached to the housing adjacent one end of the housing aperture.

Example 20 provides the device any one of Examples 1-19 and optionally wherein the friction inducing member comprises a flat ring gasket fixedly attached to the housing adjacent one end of the housing aperture.

Example 21 provides a method of making a device configured to be mounted to a planar mounting panel, the method comprising: fixedly attaching a friction inducing member to a housing of the device adjacent a housing aperture, the housing being configured to be received in an aperture in the mounting panel; friction-fitting a fastener and the friction inducing member to one another; and coupling a dogleg tab of a dogleg mechanism to one end of the fastener, the dogleg tab being configured to be disposed in a retracted position and to be disposed in an engagement position, in which engagement position the dogleg tab is disposed to engage an inside surface of the mounting panel.

Example 22 provides the method of Example 21 and optionally wherein a force of friction between the fastener and the friction inducing member is greater than or equal to a threshold force.

Example 23 provides the method of Example 22 and optionally wherein the threshold force is greater than a weight of the dogleg tab.

Example 24 provides the method of any one of Examples 21-23 and optionally wherein the friction inducing member comprises a first elastomeric gasket and further comprising: fixedly attaching a second elastomeric gasket to the dogleg tab; and friction-fitting the second gasket to the fastener.

Example 25 provides the method of Example 24 and optionally wherein a force of friction between the fastener and the second gasket is greater than or equal to a threshold force.

Example 26 provides the method of Example 25 and optionally wherein the threshold force is greater than a retention force between the dogleg tab and a dogleg retention mechanism configured to retain the dogleg tab in the retracted position.

Various embodiments are illustrated in the figures above. One or more features from one or more of these embodiments may be combined to form other embodiments.

The above detailed description is intended to be illustrative, and not restrictive. The scope of the disclosure should, therefore, be determined with references to the appended claims, along with the full scope of equivalents to which such claims are entitled.

What is claimed is:

1. A device configured to be mounted to a planar mounting panel, the device comprising:
    a housing configured to be received in an aperture in the mounting panel, the housing including a housing aperture and a recess;
    a threaded fastener disposed in the housing aperture;
    a dogleg tab; and
    a friction inducing member fit to the fastener, wherein:
        the friction inducing member includes a plurality of protrusions extending inwardly within the housing aperture;
        the dogleg tab is configured to be disposed in a retracted position in which the dogleg tab is disposed within the recess, and to be disposed in an engagement position in which the dogleg tab is disposed to engage an inside surface of the mounting panel;
        the friction inducing member is fit to the fastener with a force of friction greater than or equal to a first threshold force; and
        the first threshold force is greater than a downward force of gravity acting on the dogleg tab.

2. The device of claim 1, wherein the friction inducing member is fixedly attached to the dogleg tab.

3. The device of claim 1, wherein the friction inducing member is fixedly attached to the housing adjacent the housing aperture.

4. The device of claim 3, wherein the friction inducing member is fixedly attached to the housing with an adhesive.

5. The device of claim 3, wherein the friction inducing member is disposed within the housing aperture.

6. The device of claim 5, wherein the protrusions comprise fins that extend inwardly within the housing aperture.

7. The device of claim 6, wherein the fins comprise generally straight fins.

8. The device of claim 6, wherein the fins extend radially inwardly within the housing aperture.

9. The device of claim 6, wherein the fins comprise non-straight fins.

10. The device of claim 1, wherein the protrusions comprise ribs extending inwardly within the housing aperture.

11. The device of claim 10, wherein each of the ribs has a speed-bump-like cross-sectional shape.

12. The device of claim 1, wherein the protrusions comprise fins extending inwardly within the housing aperture.

13. The device of claim 12, wherein the fins are configured to engage a head of the threaded fastener such that the head is friction fit to the fins.

14. The device of claim 12, wherein the fins comprise four generally straight fins.

15. The device of claim 12, wherein the fins extend inwardly within the housing aperture but not radially inwardly.

16. A method of making a device configured to be mounted to a planar mounting panel, the method comprising:
    fitting a fastener located within a housing aperture of a housing configured to be received in an aperture in the mounting panel and a friction inducing member to one another, wherein fitting includes selecting the friction inducing member based on a force of friction the friction inducing member is configured to apply to the fastener, and wherein the force of friction is greater than or equal to a first threshold force; and
    coupling a dogleg tab of a dogleg mechanism to one end of the fastener, the dogleg configured to be disposed in a retracted position in which the dogleg tab is disposed within a recess of the housing and to be disposed in an engagement position in which the dogleg tab is disposed to engage an inside surface of the mounting panel, wherein the first threshold force is greater than a downward force of gravity acting on the dogleg tab,
    wherein the friction inducing member includes a plurality of protrusions extending inwardly within the housing aperture.

17. The method of claim 16, wherein the method first comprises fixedly attaching the friction inducing member to the dogleg tab.

18. The method of claim 16, wherein the method first comprises fixedly attaching the friction inducing member to the housing adjacent the housing aperture.

19. The method of claim 18, wherein the protrusions comprise fins that extend inwardly within the housing aperture.

20. The method of claim 19, wherein the fins comprise generally straight fins.

* * * * *